(12) United States Patent
Lin

(10) Patent No.: US 7,496,235 B2
(45) Date of Patent: Feb. 24, 2009

(54) SCAN LINE TO BLOCK RE-ORDERING BUFFER FOR IMAGE COMPRESSION

(75) Inventor: Sheng Lin, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 652 days.

(21) Appl. No.: 11/195,689

(22) Filed: Aug. 3, 2005

(65) Prior Publication Data

US 2007/0031044 A1 Feb. 8, 2007

(51) Int. Cl.
 *G06K 9/36* (2006.01)
(52) U.S. Cl. .................................... 382/232
(58) Field of Classification Search ......... 382/232–233, 382/305; 348/715; 345/530–539; 358/404, 358/444, 448; 375/240.13, 240.25; 710/22
 See application file for complete search history.

(56) References Cited

U.S. PATENT DOCUMENTS

| | | | | |
|---|---|---|---|---|
| 5,239,388 A | * | 8/1993 | Matsumoto | 358/448 |
| 5,450,599 A | * | 9/1995 | Horvath et al. | 382/233 |
| 5,777,755 A | * | 7/1998 | Aoki et al. | 358/444 |
| 6,636,222 B1 | * | 10/2003 | Valmiki et al. | 345/505 |
| 2004/0042668 A1 | | 3/2004 | Kaplinsky et al. | |

\* cited by examiner

*Primary Examiner*—Jose L Couso
(74) *Attorney, Agent, or Firm*—Dickstein Shapiro LLP

(57) ABSTRACT

A re-order buffer memory in a real-time application such as e.g., an imager. Initially, input data is written into the re-order buffer using a first addressing mode, which causes the data to be stored in a line-by-line manner. Prior to receiving the last line of input data, the stored data is read-out in blocks of data that spans multiples lines in the buffer. This frees up space in the re-order buffer. Subsequently received input data is written into the re-order buffer using a second addressing mode, which stores the newly received data in vertical segments of the re-order buffer whose stored data has already been read-out. Writing/reading of the re-order buffer alternates between the first and second addressing modes. Using this technique, a single buffer may be used to input new data while existing data is being read-out.

16 Claims, 5 Drawing Sheets

SCAN LINE TO BLOCK RE-ORDERING BUFFER FOR IMAGE COMPRESSION

FIELD OF THE INVENTION

The present invention relates generally to the field of image compression and, more particularly to, image compression in a real-time application such as e.g., an imager.

BACKGROUND OF THE INVENTION

The transfer and storage of "real-time" data involves ever increasing bandwidth as the uses of electronic information continue to increase. Increased use of real-time data requires maximum transfer rates with minimum data loss or processing errors. Accordingly, interest in data compression has increased, both with respect to "lossless" data compression (in which excess data redundancy is eliminated without data loss) and to "lossy" compression, which removes redundant data as well as data judged to be "insignificant" according to criteria specific to the data application.

Although substantial progress has been made in development of lossless compression techniques, the amount of lossless compression possible in many applications is limited. For image compression, for example, a maximum compression ratio of 2:1 or less is typically realized. Lossy data compression techniques, on the other hand, are capable of substantially greater compression ratios in applications involving time series representations of analog signals (such as speech or music) and two-dimensional arrays representing images (still, motion or video). Thus, in these applications, a portion of the data can be thrown away without noticeable errors during reconstruction.

Image processing applications are particularly suitable for lossy data compression techniques, since in many cases the image data sets are large. Images involve considerable redundancy and can be successfully compressed, using techniques such as the discrete cosine transform (DCT) in accordance with the JPEG (Joint Photographic Experts Group) standard. Compression ratios better than 10:1 without perceptual loss, and 20:1 or better with tolerable losses, can be achieved using the JPEG DCT compression or other JPEG compression techniques.

Typical image compression systems, when using a compression technique such as one of the JPEG standardized techniques, input a frame or large set of real-time image data into a buffer memory. Once all of the image data has been stored in the buffer memory, the image data must be read-out of the memory so it can be encoded or compressed by an image compression engine or encoder logic. Since the system runs in real-time, additional image data is often received during the time the first set of data is undergoing or about to undergo compression. To ensure that none of the real-time input data overwrites the stored data, a second buffer memory is required to input the new image data (so the first set of image data can be readout from the first buffer memory). The buffer memories used to store the input data can be rather large (on the order of megabytes), which takes up valuable space in the system and adds increased cost to the system. This is undesirable.

Accordingly, there is a need and desire to reduce the amount of buffer memory required to compress data in a real-time application such as e.g., an imager.

SUMMARY OF THE INVENTION

The invention provides a real-time application, such as e.g., an imager, that utilizes only a single buffer memory for the input of real-time data and subsequent compression of the input data.

The above and other features and advantages are achieved in various exemplary embodiments of the invention by providing a re-order buffer memory in a real-time application such as e.g., an imager. Initially, input data is written into the re-order buffer using a first addressing mode, which causes the data to be stored in a line-by-line manner. Prior to receiving the last line of input data, the stored data is read-out in blocks of data that spans multiples lines in the buffer. This frees up space in the re-order buffer. Subsequently received input data is written into the re-order buffer using a second addressing mode, which stores the newly received data in vertical segments of the re-order buffer whose stored data has already been read-out. Writing/reading of the re-order buffer alternates between the first and second addressing modes. Using this technique, a single buffer may be used to input new data while existing data is being read-out.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

The present invention relates to data compression for a real-time application. Although the invention is described as being used in a real-time imager application, for the compression of real-time image data, it should be appreciated that the invention will apply to other real-time applications that require the compression of real-time data. In addition, the invention is described, for exemplary purposes only, as using JPEG forms of compression/encoding. It should be appreciated, however, that the novel aspects the invention are not limited to the type of compression/encoding used on the data described herein.

As set forth above, one form of compression used in real-time applications such as e.g., imagers, is JPEG encoding. There are multiple forms of JPEG encoding that could be used to compress data such as e.g., image data. JPEG encoding may also be used on color image data. In JPEG encoding the data to be compressed/encoded is grouped into multiple minimum coded units (MCUs). Each MCU consists of one or more 8-by-8 blocks of data. For an imager application, each MCU consists of one or more 8-by-8 blocks of pixel data.

MCUs are used to break down the image into workable blocks of data for the encoding process.

Figure 1:
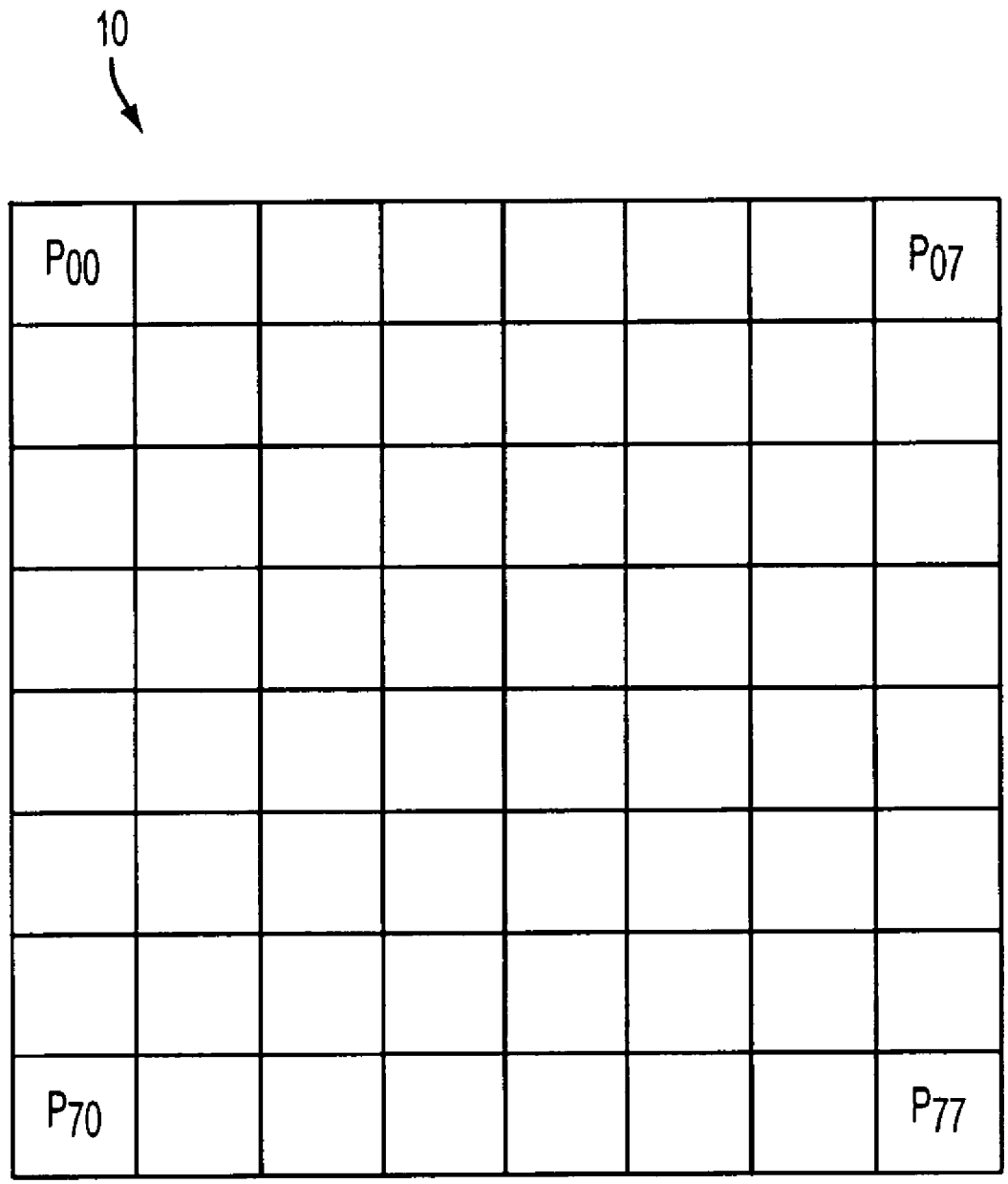
FIG. 1 is an illustration of an exemplary minimum coded unit used in image compression techniques.

The manner in which the data is grouped in the MCUs depends on the type of compression/encoding scheme being implemented and is not limiting to this invention. For example, one known JPEG compression color format is the YCbCr 4:2:2 format. The YCbCr 4:2:2 format requires 8 lines of pixel data for luminance component Y and 8 lines of pixel data for chrominance components Cb and Cr to re-order the image pixels into MCUs. For each 8-by-8 block of an MCU, input pixels must be provided to a JPEG encoder in the order of $P_{00}, P_{01}, \ldots P_{07}, P_{10}, \ldots, P_{17}, \ldots, P_{77}$. FIG. 1 illustrates an 8-by-8 MCU block 10 required for the DCT-based compression. It should be appreciated that the block 10 could have a different size or pixel arrangement, depending upon the encoding format used. Other known JPEG encoding formats that could be used with the invention include, for example, YCbCr 4:4:4, YCbCr 4:2:0 and monochrome formats.

Figure 2:
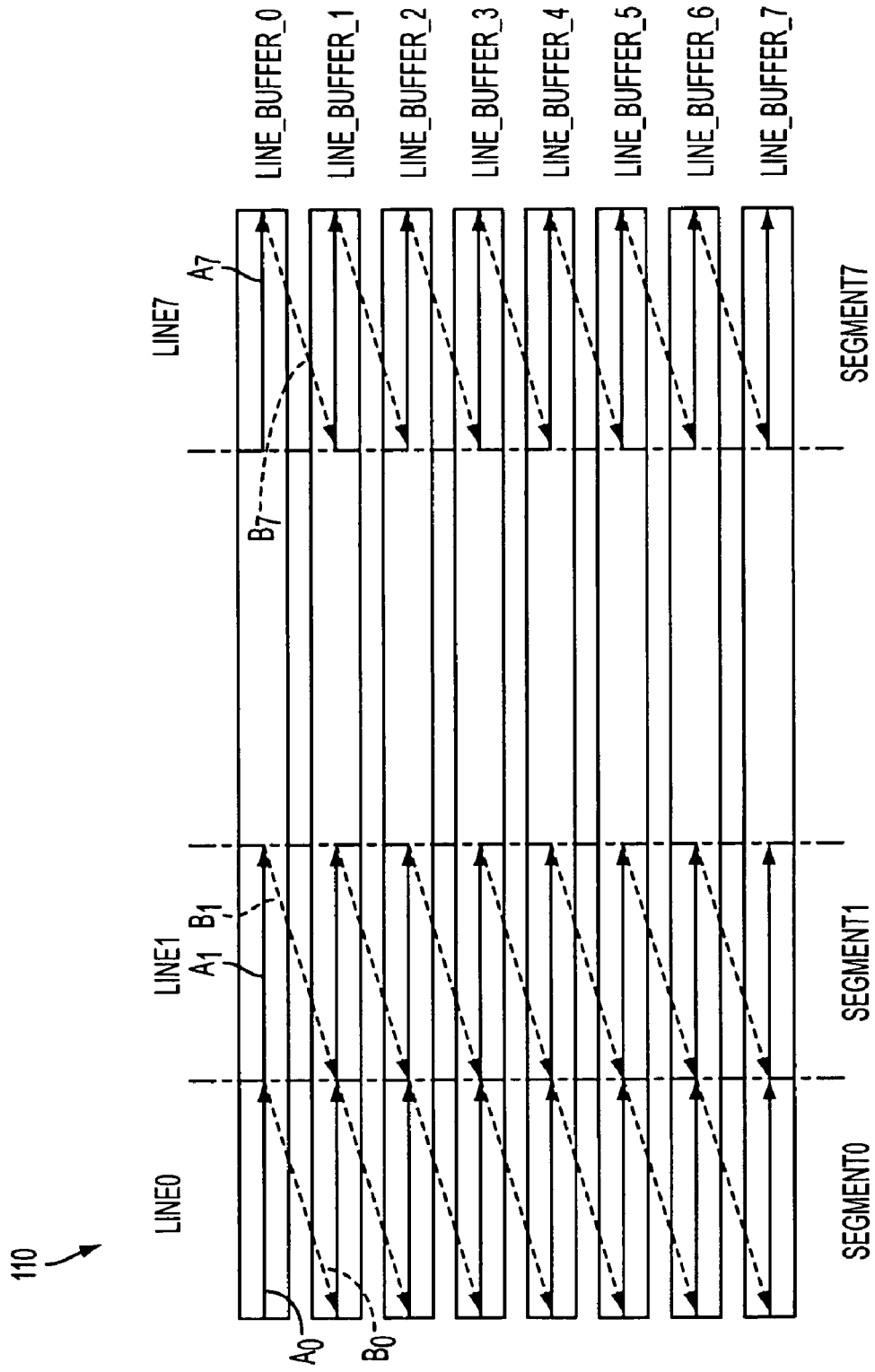
FIG. 2 is an illustration of a re-order buffer memory according to an exemplary embodiment of the invention.

Input image data must be written into a buffer memory prior to being read-out and compressed/encoded by an encoder such as a JPEG encoder. In prior art techniques, two buffer memories were required to ensure that stored image data was not overwritten by new image data. In accordance with the present invention, only one buffer memory is used. FIG. 2 is an illustration of a re-order buffer memory 110 according to an exemplary embodiment of the invention. The buffer memory 110 comprises eight line buffers Line_buffer_0, ..., Line_buffer_7. Each line buffer Line_buffer_0, ..., Line_buffer_7 is configured to receive all of the image data from a raster scan line of image data. Thus, if a line of input data contains 1024 bytes of information, then the line buffers Line_buffer_0, ..., Line_buffer_7 will need to be at least 1024 bytes wide.

The exact size of each line buffer Line_buffer_0, ..., Line_buffer_7 is application specific. In addition, it should be appreciated that if more than eight lines of data are required for a specific application of the invention, then the re-order buffer memory 110 would contain more than eight line buffers. Likewise, it should be appreciated that if less than eight lines of data are required for a specific application of the invention, then the re-order buffer memory 110 would contain less than eight line buffers. For exemplary purposes only, the invention is described as requiring eight line buffers Line_buffer_0, ..., Line_buffer_7 and 8-by-8 MCU blocks 10 for one of the color components of the image to be compressed.

In the desired embodiment of the invention, there are two addressing modes for writing data into the re-order buffer 110. The same two addressing modes are used to read data out of the re-order buffer memory 110. A re-order buffer controller 130 (FIG. 3) toggles the two addressing modes after every eight lines of data is written and read. Initially, data is written into the re-order buffer memory 110 in the first addressing mode. In accordance with the first addressing mode, pixel data from the first line of image data is stored in the first line buffer Line_buffer_0, pixel data from the second line of image data is stored in the second line buffer Line_buffer_1, pixel data from the third line of image data is stored in the third line buffer Line_buffer_2, and so on. That is, the input data is stored line-by-line in the line buffers Line_buffer_0, ..., Line_buffer_7 of the re-order buffer 110.

In accordance with the second addressing mode, the re-order buffer 110 is virtually segmented into eight vertical segments Segment0, Segment1, ..., Segment7. The first segment Segment0 comprises the first ⅛th of every line buffer Line_buffer_0, ..., Line_buffer_7. The second segment Segment1 comprises the second ⅛th of every line buffer Line_buffer_0, ..., Line_buffer_7, etc., with the eighth segment Segment7 comprising the last ⅛th of every line buffer Line_buffer_0, ..., Line_buffer_7. It should be appreciated that the number of segments is equal to the number of line buffers, which could vary depending upon the application and/or the size of the MCUs used for compression/encoding. Thus, the invention is not to be limited to eight segments or to segments comprising one eighth of each line buffer. All that is required is that each segment evenly spans across all line buffers and the size of a segment is equal to the size of a line buffer.

During the second addressing mode, the first line of pixels Line0 is written into the first segment Segment0 in the order of left to right (as shown by arrow $A_0$) and top to bottom (as shown by arrow $B_0$, which starts from the right hand side of solid arrow $A_0$ and ends at the left hand side of the next line buffer). Also during the second addressing mode, the second line of pixels Line1 is written into the second segment Segment1 in the order of left to right (as shown by arrow $A_1$) and top to bottom (as shown by arrow $B_1$). This same writing pattern continues until the eighth line of pixels Line7 is written into the eighth segment Segment7, also in the order of left to right (as shown by arrow $A_7$) and top to bottom (as shown by arrow $B_7$). Thus, during the second addressing mode, the input image data is stored in vertical segments Segment0, ..., Segment7 of the re-order buffer 110 instead of the line-by-line manner used during the first addressing mode.

The unique addressing and virtual segmenting of the re-order buffer memory 110 benefits from a novel approach to reading the data out of the buffer memory 110, which is now described. After the first seven lines of image data are written into the re-order buffer memory 110, regardless of the addressing mode used, the reading-out of stored data from the re-order buffer memory 110 begins when the writing of the eighth line of data begins. The stored data is read-out in eight-by-eight blocks. That is, for each eight-by-eight block eight pixels are read-out either from each line buffer Line_buffer_0, ..., Line_buffer_7 or from each segment Segment0, ..., Segment7, depending on how the stored data was written. Once the first 8-by-8 block is read-out, the next 8-by-8 block is read-out, and so on. Thus, as data is being written into the buffer memory 110, stored data is being read-out. It is important to note that the read addresses should be computed based on how the stored data was written. Thus, if the stored data was written using the first addressing mode, the data should be read-out using addresses based on the first addressing mode. Likewise, if the stored data was written using the second addressing mode, the data should be read-out using addresses based on the second addressing mode.

In operation, the re-order buffer controller 130 (FIG. 3) starts the storing process using the first addressing mode for the first eight lines of image pixel data, then switches to the second addressing mode for the next eight lines of pixel data, then back to the first addressing mode for the next eight lines, and so on until all of the real-time data is processed. The unique addressing and segmenting of the re-order buffer memory 110 allows a single memory to be used to store and read-out real-time data requiring data compression/encoding—something conventional compression systems cannot do.

Figure 3:
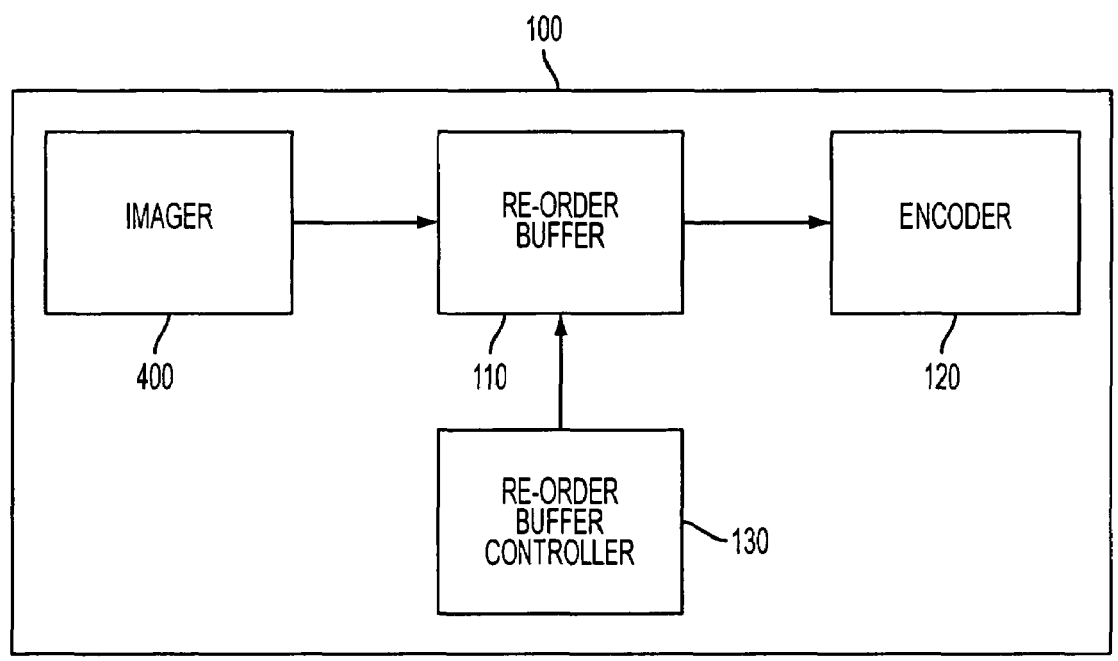
FIG. 3 is a block diagram of an imaging system according to an exemplary embodiment of the invention.

FIG. 3 is a block diagram of an imaging system 100 according to an exemplary embodiment of the invention. In a preferred embodiment, the entire system 100 resides on a single integrated circuit chip. The system 100 includes an imager 400, the re-order buffer memory 110, re-order buffer controller 130 and an encoder 120. The encoder 120 may be a JPEG encoder or other encoder/compression engine/logic desired to implement the required encoding/compression of image data from the imager 400. The imager 400 may be a CMOS imager, CCD imager, or other real-time imaging device. The output of the imager 400 is stored in the re-order buffer memory 110 under the control of the re-order buffer controller 130 (as described above with respect to FIG. 2). Data read-out from the re-order buffer memory 110 is encoded/compressed by the encoder 120.

Figure 4:
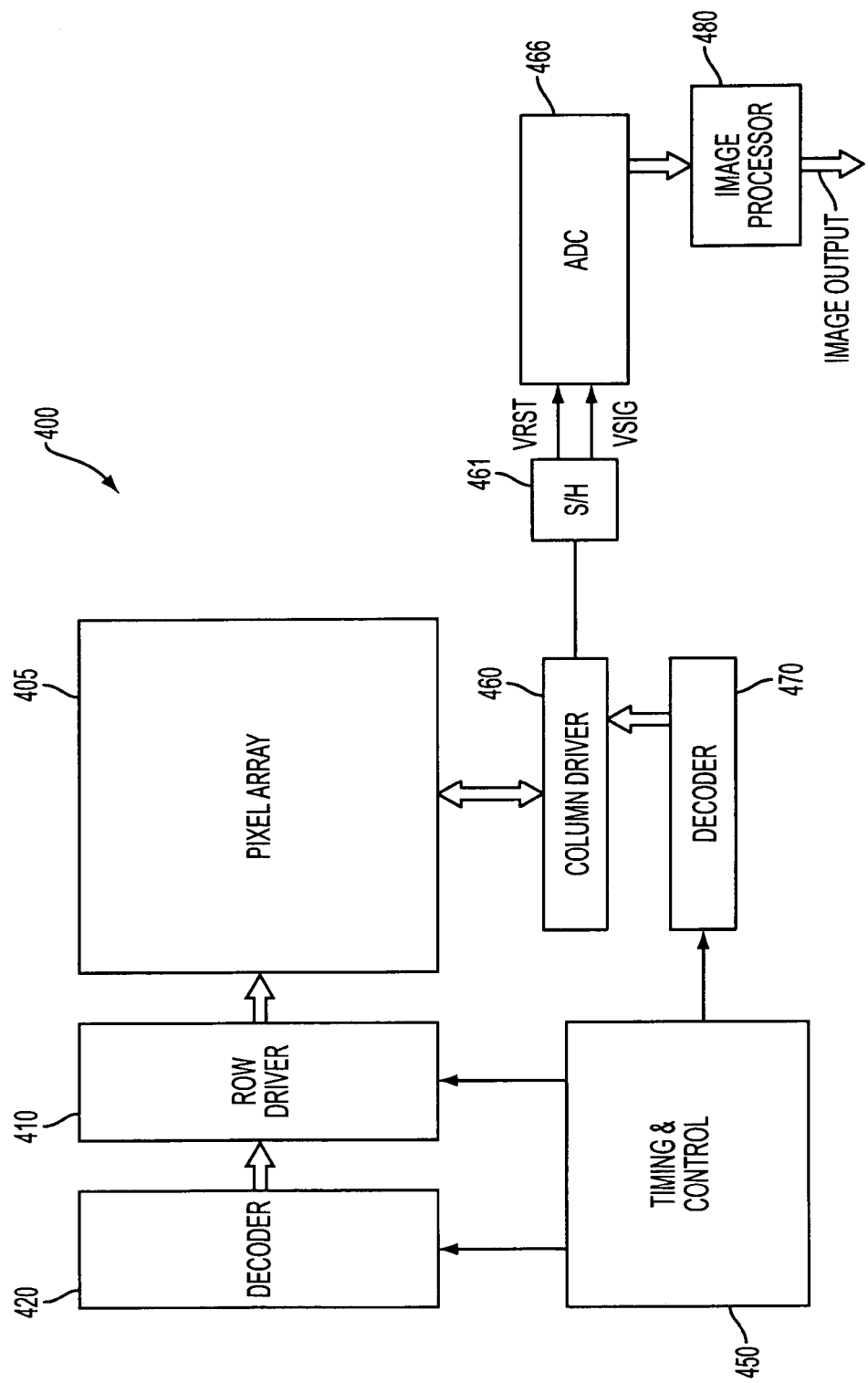
FIG. 4 is a block diagram of a CMOS imager, which may be utilized in the imaging system illustrated in FIG. 3.

FIG. 4 illustrates an exemplary imager 400 that may be used in the imaging system 100 of FIG. 3. The imager 400 has a pixel array 405. Row lines are selectively activated by a row driver 410 in response to row address decoder 420. A column driver 460 and column address decoder 470 are also included in the imager 400. The imager 400 is operated by the timing and control circuit 450, which controls the address decoders 420, 470. The control circuit 450 also controls the row and column driver circuitry 410, 460.

A sample and hold circuit 461 associated with the column driver 460 reads a pixel reset signal Vrst and a pixel image signal Vsig for selected pixels. An analog-to-digital converter 466 (ADC) outputs a digital code corresponding to the difference between the Vrst and Vsig signals. The analog-to-digital converter 466 supplies the digitized pixel signals to an image processor 480, which forms and outputs a digital image. The output digital image data is subsequently input into the re-order buffer 110 (FIG. 3) where it is stored for subsequent data compression/encoding as described above with reference to FIGS. 2 and 3.

Figure 5:
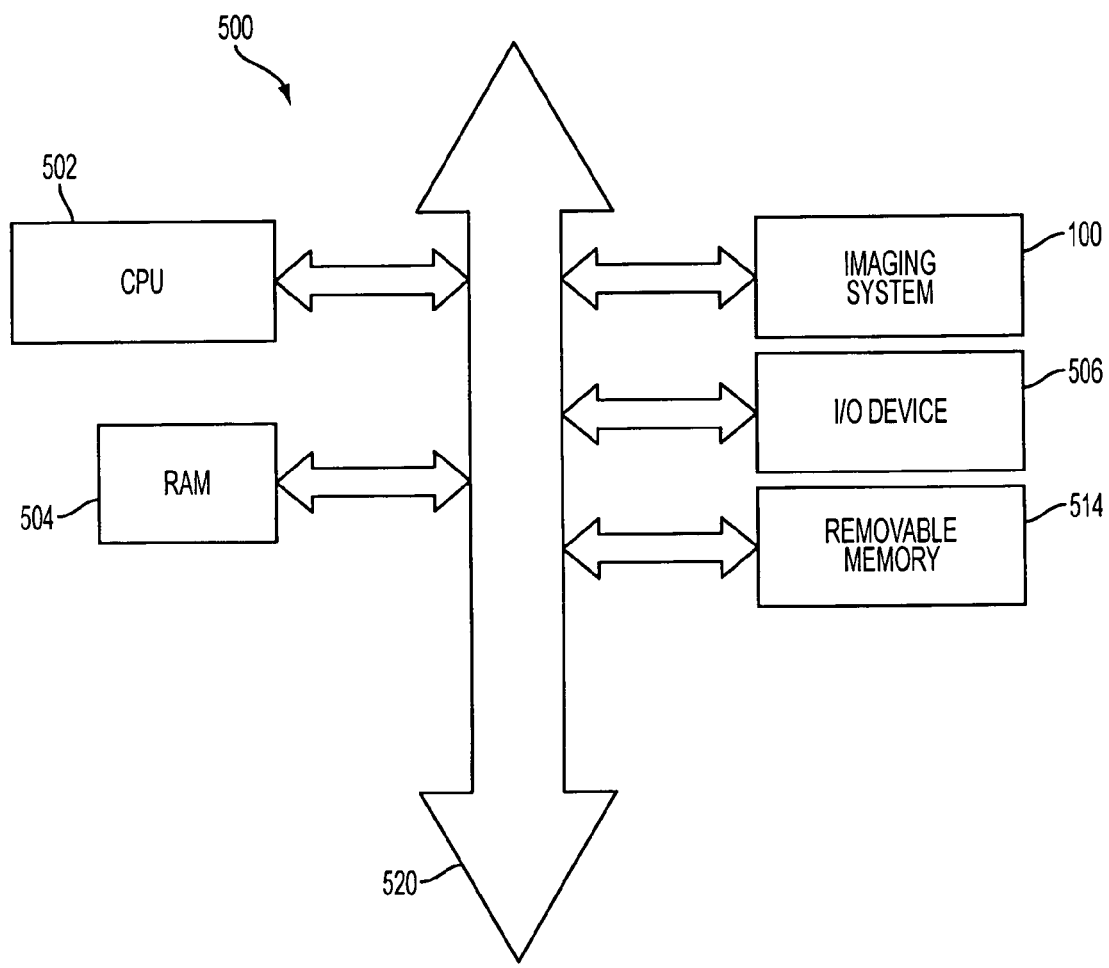
FIG. 5 is a block diagram of a processing system utilizing the imaging system illustrated in FIG. 3.

FIG. 5 shows a system 500, a typical processor system modified to include an imaging system 100 (FIG. 3) of the invention. The processor system 500 is exemplary of a system having digital circuits that could include imager devices and image compression devices (e.g., a JPEG encoder). Without being limiting, such a system could include a computer system, camera system, scanner, machine vision, vehicle navigation, video phone, surveillance system, auto focus system, star tracker system, motion detection system, image stabilization system, and data compression system.

System 500, for example a camera system, generally comprises a central processing unit (CPU) 502, such as a microprocessor, that communicates with an input/output (I/O) device 506 over a bus 520. Imaging system 100 also communicates with the CPU 502 over the bus 520. The processor-based system 500 also includes random access memory (RAM) 504, and can include removable memory 514, such as flash memory, which also communicate with the CPU 502 over the bus 520. The imaging system 100 may be combined with a processor, such as a CPU, digital signal processor, or microprocessor, with or without memory storage on a single integrated circuit or on a different chip than the processor.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. A method of processing real-time data, said method comprising the acts of:
    storing first data into a buffer using a first addressing mode, the buffer comprising multiple line buffers and said act of storing the first data comprises storing the first data line by line in a respective line buffer;
    reading-out the stored first data in predetermined data blocks; and
    storing second data into the buffer using a second addressing mode whereby the buffer is virtually configured into segments, each segment comprising a portion of each line buffer, and said act of storing the second data comprises storing lines of second data in a respective segment,
    wherein said reading-out act begins as a portion of the first data is being stored in the buffer.

2. The method of claim 1, wherein said reading-out act is based on the first addressing mode.

3. The method of claim 1, further comprising the act of reading-out the stored second data in predetermined data blocks.

4. The method of claim 3, wherein said reading-out of the stored second data is based on the second addressing mode.

5. The method of claim 1, further comprising the act of encoding the read-out first data.

6. The method of claim 1, further comprising the acts of:
    reading-out the stored second data in predetermined data blocks; and
    encoding the read-out second data.

7. A system for processing real-time data, said system comprising:
    a re-order buffer, said re-order buffer comprising a plurality of line buffers; and
    a controller connected to said re-order buffer, said controller causing first data to be stored in said re-order buffer in a line-by-line manner using a first addressing mode, said controller causing the first data to be read-out of said re-order buffer when a last line of the first data begins to be stored in a last line buffer of the line buffers, and said controller causing second data to be stored in said re-order buffer using a second addressing mode whereby the controller virtually configures said re-order buffer into segments, wherein each segment comprises a portion of each line buffer.

8. The system of claim 7, wherein the first data is read-out in predetermined data blocks based on the first addressing mode.

9. The system of claim 7, wherein the controller causes the second data to be read-out in predetermined data blocks based on the second addressing mode.

10. The system of claim 7, further comprising an encoding circuit connected to said re-order buffer, said encoding circuit encoding the read-out first data.

11. The system of claim 10, wherein said controller causes the stored second data to be read-out of said buffer in predetermined data blocks, and said encoding circuit encodes the read-out second data.

12. A processor system comprising:
    a processor; and
    an imaging device connected to said processor, said imaging device comprising:
    an imager, said imager outputting real-time image data,
    a re-order buffer connected to said imager, said re-order buffer comprising a plurality of line buffers, and
    a controller connected to said re-order buffer, said controller causing first image data to be stored in said re-order buffer in a line-by-line manner using a first addressing mode, said controller causing the first image data to be read-out of said re-order buffer when a last line of the first image data begins to be stored in a last line buffer of the line buffers, and said controller causing second image data to be stored said re-order buffer using a second addressing mode whereby the controller virtually configures said re-order buffer into segments, wherein each segment comprises a portion of each line buffer.

13. The system of claim 12, wherein the first image data is read-out in predetermined data blocks based on the first addressing mode.

14. The system of claim 13, wherein each block is configured as a minimum coded unit.

15. The system of claim 12, wherein the controller causes the second image data to be read-out in predetermined data blocks based on the second addressing mode.

16. The system of claim 12, further comprising an encoding circuit connected to said re-order buffer, said encoding circuit encoding the read-out first image data.

* * * * *